United States Patent
Yokoyama et al.

(10) Patent No.: US 9,625,585 B1
(45) Date of Patent: Apr. 18, 2017

(54) RADIATION IMAGING APPARATUS AND METHOD OF CONTROLLING RADIATION IMAGING APPARATUS

(71) Applicant: CANON KABUSHIKI KAISHA, Tokyo (JP)

(72) Inventors: Keigo Yokoyama, Honjo (JP); Minoru Watanabe, Yokohama (JP); Masato Ofuji, Takasaki (JP); Jun Kawanabe, Kawasaki (JP); Kentaro Fujiyoshi, Tokyo (JP); Hiroshi Wayama, Kawasaki (JP); Kazuya Furumoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/262,102

(22) Filed: Sep. 12, 2016

(30) Foreign Application Priority Data

Sep. 28, 2015 (JP) .................................. 2015-190335

(51) Int. Cl.
*G01T 1/17* (2006.01)
*G01T 1/02* (2006.01)
*G01T 1/20* (2006.01)

(52) U.S. Cl.
CPC ................ *G01T 1/17* (2013.01); *G01T 1/023* (2013.01); *G01T 1/2018* (2013.01)

(58) Field of Classification Search
CPC ......... G01T 1/17; G01T 1/023; G01T 1/2018; H04N 5/32; A61B 6/4233
See application file for complete search history.

(56) References Cited

U.S. PATENT DOCUMENTS

| 7,514,663 | B2 | 4/2009 | Yagi et al. ................. 250/208.1 |
| 7,541,591 | B2 | 6/2009 | Endo et al. ................... 250/369 |
| 7,573,038 | B2 | 8/2009 | Yokoyama et al. ..... 250/370.09 |
| 7,718,973 | B2 | 5/2010 | Endo et al. ............. 250/370.08 |
| 7,869,568 | B2 | 1/2011 | Yokoyama et al. ......... 378/98.8 |
| 8,107,588 | B2 | 1/2012 | Kameshima et al. .......... 378/62 |
| 8,829,438 | B2 | 9/2014 | Sato et al. ................. 250/336.1 |
| 2011/0317054 | A1 | 12/2011 | Kameshima et al. ........ 348/302 |
| 2014/0232741 | A1* | 8/2014 | Choi ...................... G09G 5/028 345/600 |

(Continued)

FOREIGN PATENT DOCUMENTS

JP 2014-219248 11/2014

*Primary Examiner* — David Porta
*Assistant Examiner* — Mindy Vu
(74) *Attorney, Agent, or Firm* — Fitzpatrick, Cella, Harper & Scinto

(57) ABSTRACT

A radiation imaging apparatus is provided. The apparatus comprises first pixels arranged in an image sensing region to obtain a radiation image, a second pixel configured to obtain a dose of incident radiation and a control unit configured to control the first pixels and the second pixel. The control unit causes the first pixels to accumulate charge corresponding to a radiation dose, while causing the second pixel to operate in a detection cycle determined based on irradiation information of radiation before irradiation with radiation, obtains a dose of incident radiation for each detection cycle, and corrects the obtained radiation dose in accordance with an amount of noise output from the second pixel operating in the detection cycle.

19 Claims, 12 Drawing Sheets

(56) References Cited

U.S. PATENT DOCUMENTS

| | | | |
|---|---|---|---|
| 2015/0226865 A1* | 8/2015 | Nishihara | H01L 27/14609 250/366 |
| 2015/0316661 A1 | 11/2015 | Fujiyoshi et al. | G01T 1/2018 |
| 2015/0319382 A1 | 11/2015 | Kawanabe et al. | H04N 5/359 |
| 2015/0362601 A1 | 12/2015 | Ofuji et al. | G01T 1/2018 |
| 2016/0025865 A1 | 1/2016 | Wayama et al. | G01T 1/026 |
| 2016/0041276 A1 | 2/2016 | Kawanabe et al. | G01T 1/247 |
| 2016/0047920 A1 | 2/2016 | Yokoyama et al. | G01T 1/247 |

\* cited by examiner

F I G. 1A
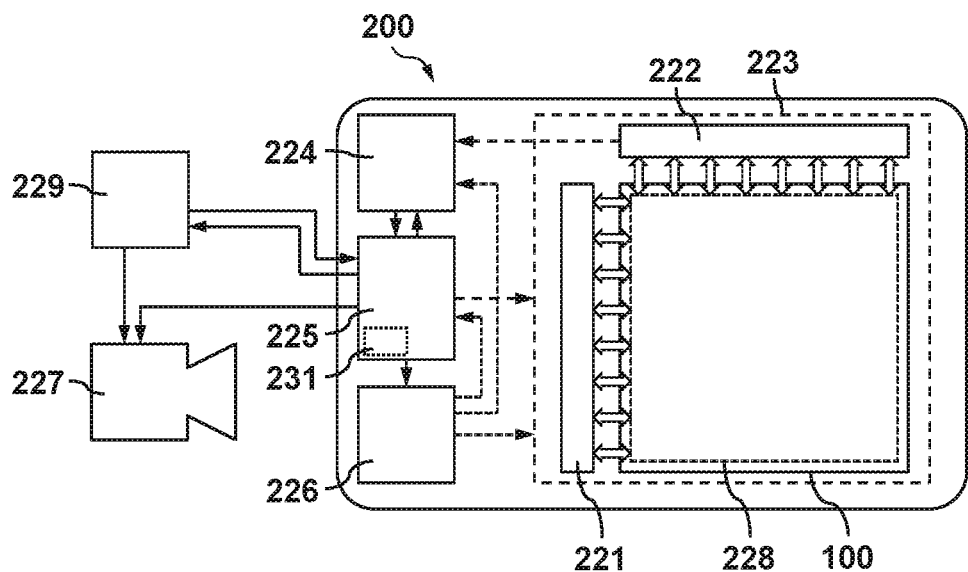
F I G. 1B
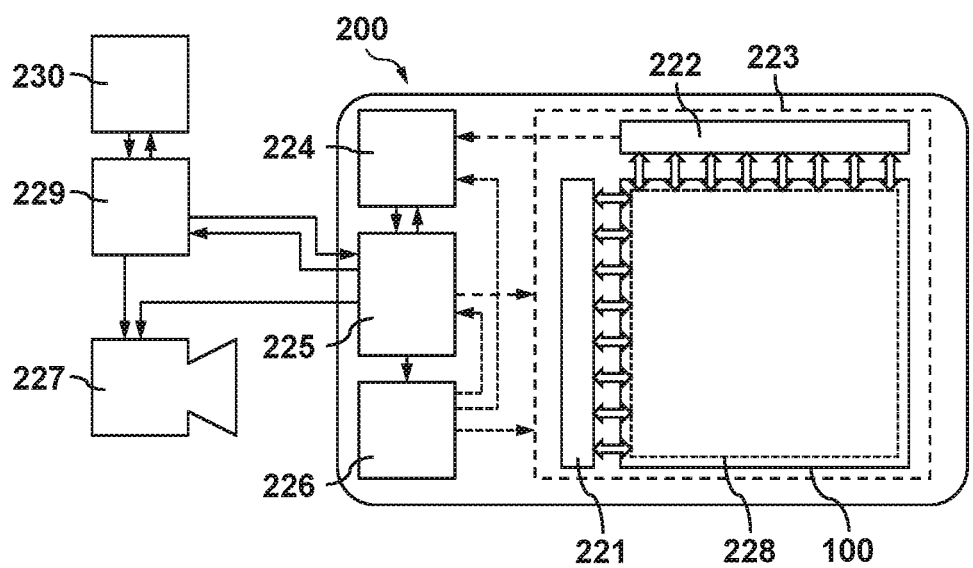

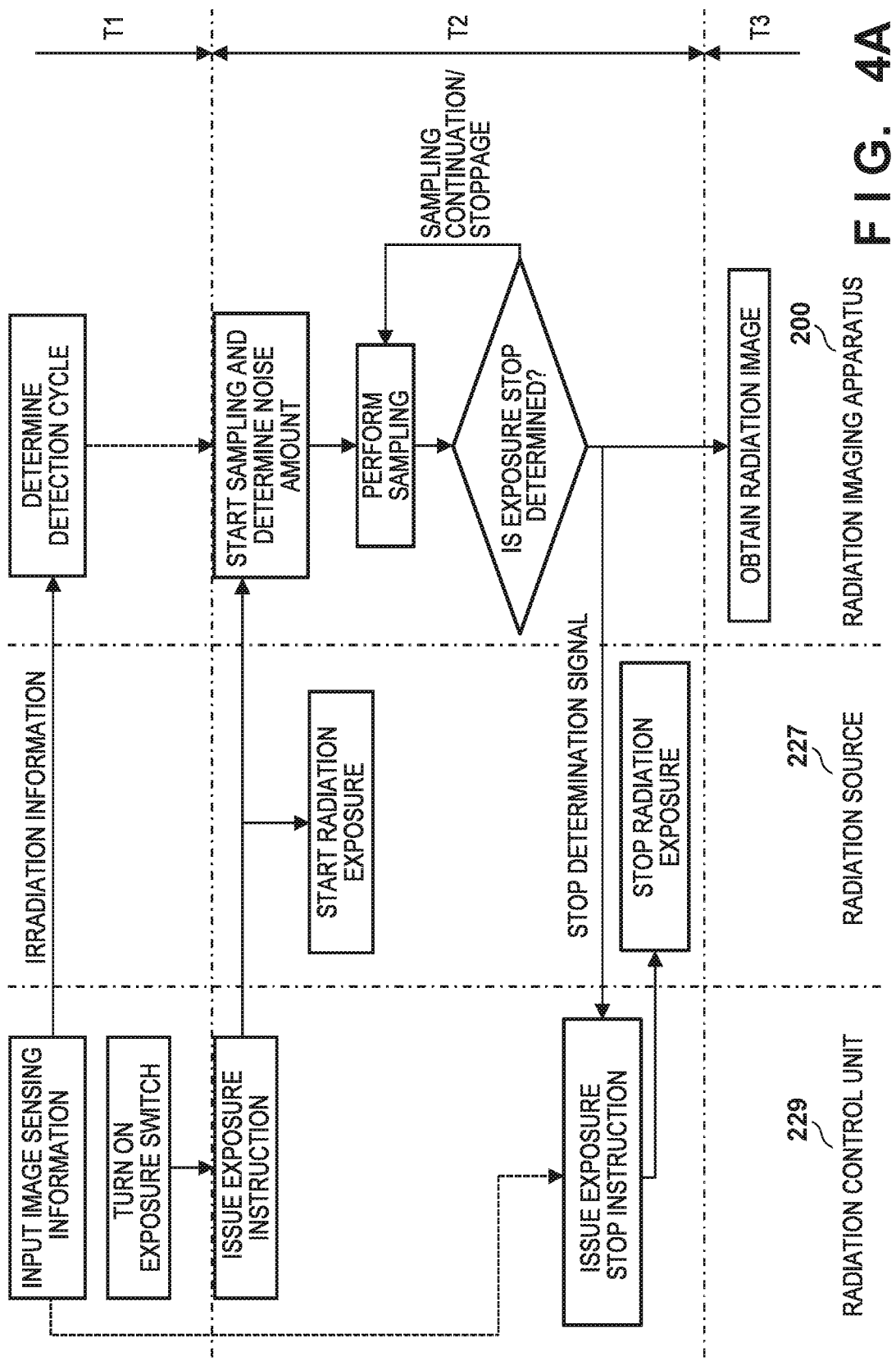

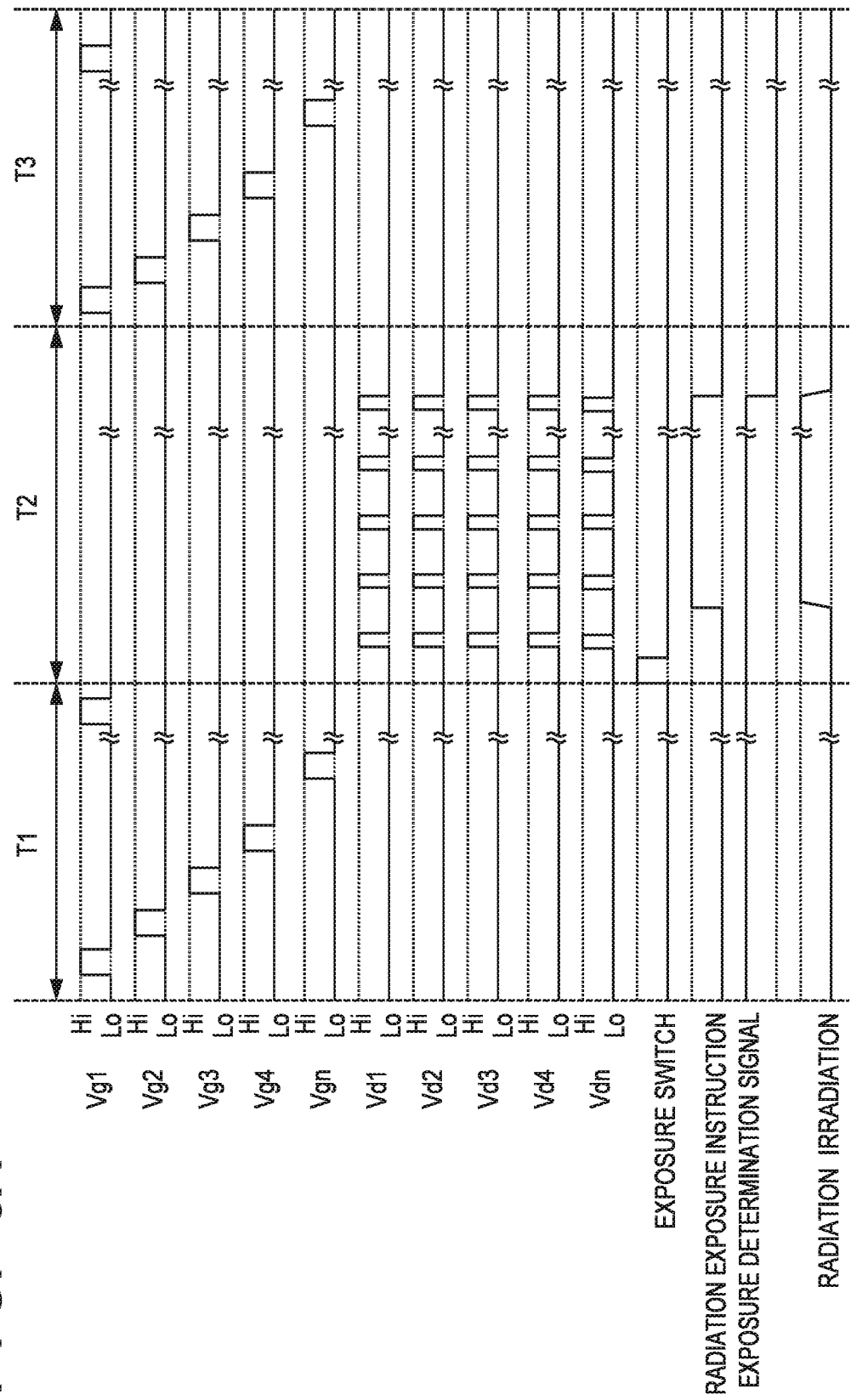

RADIATION IMAGING APPARATUS AND METHOD OF CONTROLLING RADIATION IMAGING APPARATUS

BACKGROUND OF THE INVENTION

Field of the Invention

The present invention relates to a radiation imaging apparatus, and a method of controlling the radiation imaging apparatus.

Description of the Related Art

A radiation imaging apparatus has been widely used, which includes a pixel array including a two-dimensional array of pixels each obtained by combining a conversion element which converts radiation into electric charge and a switch element such as a TFT (Thin-Film Transistor). Such a radiation imaging apparatus is known to have an AEC (Automatic Exposure Control) function. The AEC function detects the dose of radiation incident on the radiation imaging apparatus during irradiation with radiation. Japanese Patent Laid-Open No. 2014-219248 discloses a technique of changing a detection cycle in accordance with an incident radiation dose during irradiation with radiation.

SUMMARY OF THE INVENTION

As the dose of radiation incident on a radiation imaging apparatus decreases, a signal amount obtained by conversion from the incident radiation also decreases. A reduction in signal amount may decrease the S/N ratio of radiation amount detection and increase the influence of noise output from each pixel for detecting a radiation dose. Japanese Patent Laid-Open No. 2014-219248 discloses nothing about the influence of noise output from each pixel for detecting a radiation dose.

Some embodiments of the present invention provide a technique of more accurately detecting the dose of radiation incident on a radiation imaging apparatus.

According to some embodiments, a radiation imaging apparatus comprising: a plurality of first pixels arranged in an image sensing region to obtain a radiation image; a second pixel configured to obtain a dose of incident radiation during irradiation with radiation; and a control unit configured to control the plurality of first pixels and the second pixel, wherein the control unit causes the plurality of first pixels to accumulate electric charge corresponding to a radiation dose, while causing the second pixel to operate in a detection cycle determined based on irradiation information of radiation before irradiation with radiation, obtains a dose of incident radiation for each detection cycle, and corrects the obtained radiation dose in accordance with an amount of noise output from the second pixel operating in the detection cycle.

According to some other embodiments, a radiation imaging system comprising: a radiation imaging apparatus; and a signal processing unit configured to process a signal from the radiation imaging apparatus, wherein the radiation imaging apparatus comprises: a plurality of first pixels arranged in an image sensing region to obtain a radiation image; a second pixel configured to obtain a dose of incident radiation during irradiation with radiation; and a control unit configured to control the plurality of first pixels and the second pixel, wherein the control unit causes the plurality of first pixels to accumulate electric charge corresponding to a radiation dose, while causing the second pixel to operate in a detection cycle determined based on irradiation information of radiation before irradiation with radiation, obtains a dose of incident radiation for each detection cycle, corrects the obtained radiation dose in accordance with an amount of noise output from the second pixel operating in the detection cycle, stops irradiation with radiation based on a radiation dose after correction, and reads out electric charge accumulated in the plurality of first pixels after irradiation with radiation.

According to some other embodiments, a method of controlling a radiation imaging apparatus including a plurality of first pixels arranged in an image sensing region to obtain a radiation image, and a second pixel configured to obtain a dose of incident radiation during irradiation with radiation, the method comprising: causing the plurality of first pixels to accumulate electric charge corresponding to a radiation dose; while causing the second pixel to operate in a detection cycle determined based on irradiation information of radiation before irradiation with radiation, obtaining a dose of incident radiation for each detection cycle; and correcting the obtained radiation dose in accordance with an amount of noise output from the second pixel operating in the detection cycle.

According to some other embodiments, a program stored in a non-transitory storage medium for causing a computer to execute a method of controlling a radiation imaging apparatus including a plurality of first pixels arranged in an image sensing region to obtain a radiation image, and a second pixel configured to obtain a dose of incident radiation during irradiation with radiation, the method comprising: causing the plurality of first pixels to accumulate electric charge corresponding to a radiation dose; while causing the second pixel to operate in a detection cycle determined based on irradiation information of radiation before irradiation with radiation, obtaining a dose of incident radiation for each detection cycle; and correcting the obtained radiation dose in accordance with an amount of noise output from the second pixel operating in the detection cycle.

Further features of the present invention will become apparent from the following description of exemplary embodiments (with reference to the attached drawings).

BRIEF DESCRIPTION OF THE DRAWINGS

FIGS. 1A and 1B are block diagrams showing the arrangement of a system using a radiation imaging apparatus according to the present invention;

FIGS. 4A and 4B are flowcharts of processing performed by the system using the radiation imaging apparatus in FIGS. 1A and 1B;

FIGS. 5A and 5B are timing charts in the system using the radiation imaging apparatus in FIGS. 1A and 1B;

DESCRIPTION OF THE EMBODIMENTS

Figure 2:
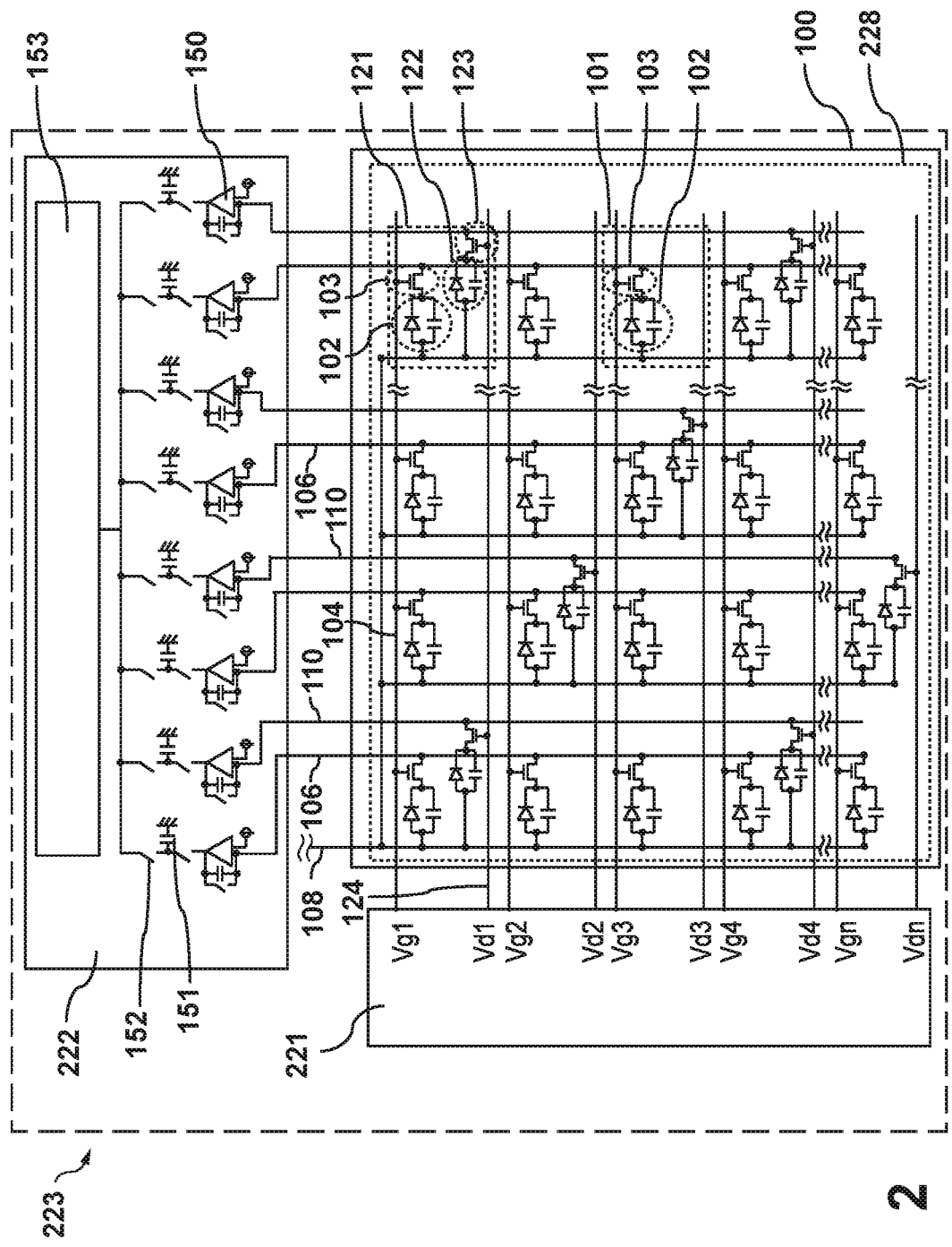
FIG. 2 is a circuit diagram of the radiation imaging apparatus in FIGS. 1A and 1B.

A detailed embodiment of a radiation imaging apparatus according to the present invention will now be described with reference to the accompanying drawings. Note that in the following description and drawings, common reference numerals denote common components throughout a plurality of drawings. Hence, the common components will be described by cross-referring to the plurality of drawings, and a description of components denoted by common reference numerals will appropriately be omitted. Note that radiation according to the present invention can include not only α-rays, β-rays, and γ-rays that are beams generated by particles (including photons) emitted by radioactive decay but also beams having energy equal to or higher than the energy of these beams, for example, X-rays, particle beams, and cosmic rays.

A radiation imaging apparatus according to some embodiments of the present invention will be described with reference to FIGS. 1A to 6. FIG. 1A shows an example of the arrangement of a radiation imaging apparatus 200 according to a first embodiment of the present invention. The radiation imaging apparatus 200 includes a detecting unit 223, a signal processing unit 224, a control unit 225, and a power supply circuit 226. The control unit 225 supplies control signals to the detecting unit 223, the signal processing unit 224, and the power supply circuit 226 to control the respective constituent elements of the radiation imaging apparatus 200. The detecting unit 223 includes a support substrate 100, a pixel array 228, a driving circuit 221, and a readout circuit 222. The pixel array 228 is arranged on the support substrate 100. The pixel array 228 is arranged in an image sensing region on the support substrate 100 and includes a plurality of first pixels including a plurality of conversion elements for obtaining a radiation image and a second pixel including a detecting element for obtaining a total incident radiation dose during irradiation with radiation. The driving circuit 221 drives the pixel array 228. The readout circuit 222 reads out, as an electrical signal, a signal generated from radiation incident on each conversion element and each detecting element of the pixel array 228. The signal processing unit 224 transfers the electrical signal from the detecting element, which is read out from the readout circuit 222, to the control unit 225. The control unit 225 outputs a signal for controlling the radiation sampling operation of the detecting unit 223 or irradiation with radiation from a radiation source 227 in accordance with this electrical signal from the detecting element. The signal processing unit 224 also supplies the electrical signal read out from the readout circuit 222 to an image processing unit (not shown) provided outside the radiation imaging apparatus 200 in accordance with a control signal supplied from the control unit 225. Upon receiving the electrical signal, the image processing unit (not shown) may generate an image from the electrical signal and output it to a display (not shown). This allows the user of the radiation imaging apparatus 200 to observe a radiation image obtained by image sensing. In addition, the signal processing unit 224 may perform imaging processing of an electrical signal. The power supply circuit 226 applies a bias voltage to each constituent element of the radiation imaging apparatus 200. In this embodiment, the signal processing unit 224 and the control unit 225 are separate components. However, for example, the control unit 225 may have an integrated arrangement to perform the processing of the signal processing unit 224.

The radiation source 227 and a radiation control unit 229 are connected to the radiation imaging apparatus 200. The radiation source 227 performs irradiation with radiation. The radiation control unit 229 controls the radiation source 227. The radiation control unit 229 controls the radiation source 227 in accordance with a control signal supplied from the control unit 225. In this embodiment, the radiation control unit 229 controls the radiation source 227. However, the control unit 225 may directly supply a control signal to the radiation source 227 without going through the radiation control unit 229. In addition, for example, although the radiation imaging apparatus 200 and the radiation control unit 229 are separately arranged in the embodiment, the radiation imaging apparatus 200 may include at least part of the function of the radiation control unit 229. In addition, the radiation imaging apparatus 200 and the radiation control unit 229 may be integrally arranged.

When performing radiation imaging, it is possible to externally input imaging conditions such as a tube current and a tube voltage to the radiation control unit 229. In addition, conditions such as a radiation irradiation time can be externally input to the radiation control unit 229 and used for control of the radiation source 227. The user may directly input values representing imaging conditions such as a tube current, a tube voltage, and an irradiation time to the radiation control unit 229. In addition, imaging conditions may be set in advance for each imaging mode, and the user may select conditions from imaging condition recipes saved in, for example, the radiation control unit 229. The radiation control unit 229 may have a user interface which receives inputs of information such as imaging conditions from the user and use a personal computer as a constituent element. The radiation control unit 229 may also include a control console attached to a radiation generator including a radiation source.

The detecting unit 223 will be described next with reference to FIG. 2. The detecting unit 223 includes the support substrate 100 on which the pixel array 228 is arranged as described above, the driving circuit 221, and the readout circuit 222. The pixel array 228 includes a plurality of pixels arranged in matrix. The plurality of pixels includes first pixels 101 and a second pixel 121.

In order to obtain a radiation image, each first pixel 101 includes a conversion element 102 which converts incident radiation or light into electric charge corresponding to the amount of incident radiation or light and a switch element 103 which outputs electric charge generated by the conversion element 102 to a signal line. The conversion element 102 may be an indirect type conversion element using a scintillator which converts, for example, radiation into light and a photoelectric conversion element which converts the light obtained by the scintillator into electric charge. Alternatively, as the conversion element 102, a direct type conversion element may be used, which directly converts, for example, radiation into electric charge. As the switch element 103, a TFT (Thin-Film Transistor) using, for example, amorphous silicon or poly silicon may be used. For example, poly silicon may be used in accordance with characteristics required for a TFT. In addition, a semiconductor material used for a TFT is not limited to silicon, and other semiconductor materials such as germanium and compound semiconductors may be used.

A first main electrode of the switch element 103 is electrically connected to a first electrode of the conversion element 102. A bias line 108 is electrically connected to a second electrode of the conversion element 102. The bias line 108 is commonly connected to the second electrodes of a plurality of conversion elements 102 arranged along a column. A common bias voltage is applied to the bias lines 108 provided for the respective columns. Each bias line 108 receives a bias voltage from the power supply circuit 226 shown in FIG. 1.

A signal line 106 is electrically connected to a second main electrode of each switch element 103. The second main electrodes of the switch elements 103 arranged along each column are commonly connected to the signal line 106. The signal line 106 is provided for each pixel column. Each signal line 106 is electrically connected to the readout circuit 222. A driving line 104 is electrically connected to the control electrode of each switch element 103. The driving line 104 is commonly connected to the control electrodes of the switch elements 103 of the plurality of first pixels 101 arranged along each row. Gate control voltages Vg1 to Vgn are applied from the driving circuit 221 to the respective driving lines 104.

Each second pixel 121 includes a detecting element 122 which converts incident radiation or light into electric charge corresponding to the incident amount to obtain a total incident radiation dose during irradiation with radiation and a switch element 123 which outputs the electric charge generated by the detecting element 122 to a signal line. In addition, each second pixel 121 may include the conversion element 102 and the switch element 103. The detecting element 122 and the switch element 123 may respectively have the same arrangements as those of the conversion element 102 and the switch element 103.

The first main electrode of the switch element 123 is electrically connected to the first electrode of the detecting element 122, and the bias line 108 provided for each column is electrically connected to the second electrode of the detecting element 122. The second main electrodes of the switch elements 123 arranged along each column are connected to a detection line 110. Each detection line 110 is electrically connected to the readout circuit 222. A driving line 124 provided for each row is connected to the control electrode of the switch element 123. Gate control voltages Vd1 to Vdn are applied from the driving circuit 221 to the respective driving lines 124.

A plurality of second pixels 121 may be arranged in an image sensing region, as shown in FIG. 2, or only one second pixel 121 may be arranged in the region. If a plurality of second pixel 121 is arranged, an incident radiation dose may be detected by only one of the detecting elements 122 of the plurality of second pixels 121 or a plurality of detecting elements.

In the readout circuit 222, the signal lines 106 and detection lines 110 are respectively connected to the inverting input terminals of operational amplifiers 150. The inverting input terminal of each operational amplifier 150 is connected to an output terminal via a feedback capacitor. The non-inverting input terminal of each operational amplifier 150 is connected to an arbitrary fixed potential. Each operational amplifier 150 functions as an electric charge/voltage conversion circuit. An A/D converter 153 is connected to the output stage of each operational amplifier 150 via a sample/hold circuit 151 and a multiplexer 152. The readout circuit 222 forms a digital conversion circuit which converts electric charge transferred from the conversion elements 102 and the detecting elements 122 of the first pixels 101 and the second pixels 121 via the signal lines 106 and detection lines 110 into electrical signals as digital signals. The readout circuit 222 may be individually arranged for each circuit upon integration of each circuit.

Figure 3A:
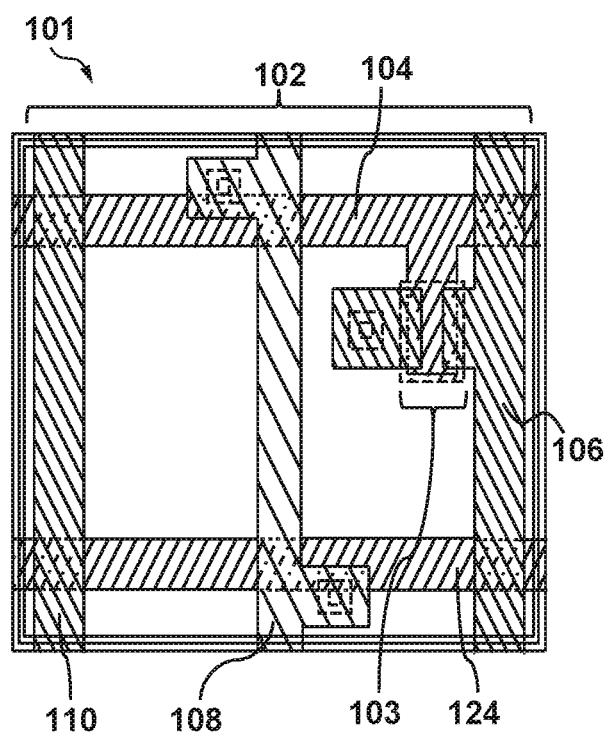
FIGS. 3A to 3C are plan views and a sectional view of pixels of the radiation imaging apparatus in FIGS. 1A and 1B.
Figure 3B:
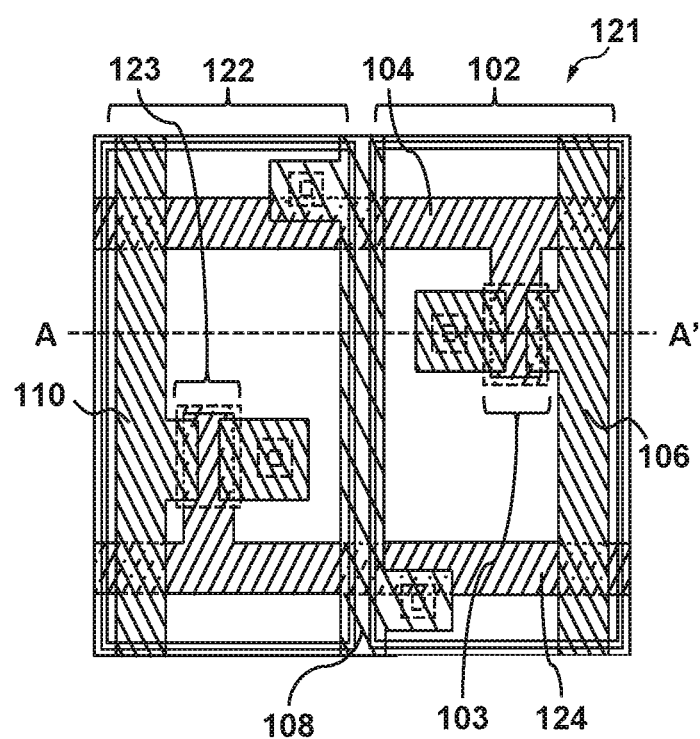
Figure 3C:
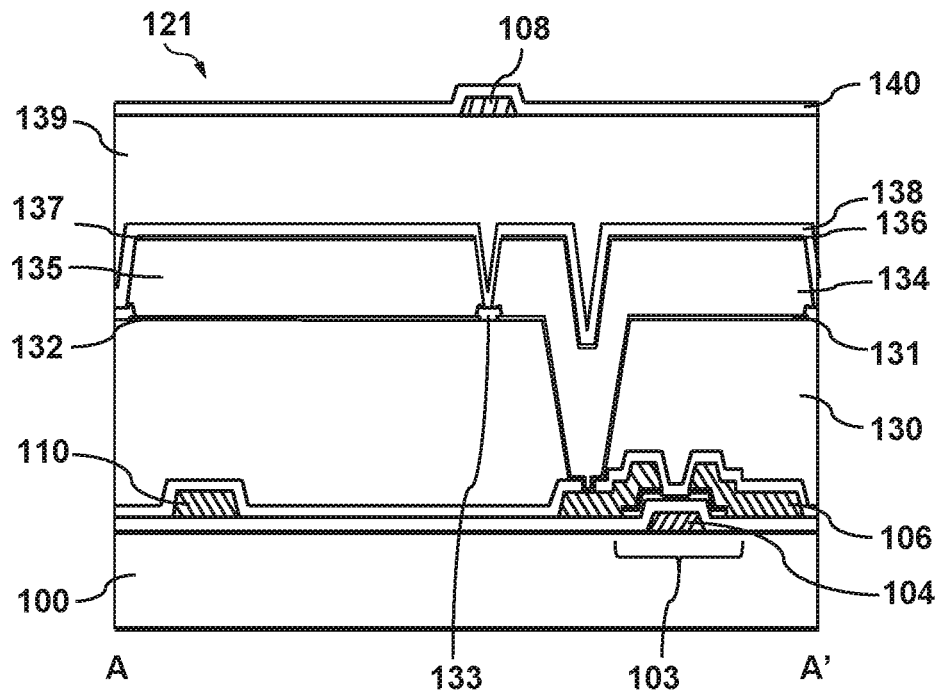

The structures of the first and second pixels 101 and 121 according to this embodiment will be described next with reference to FIGS. 3A to 3C. FIG. 3A is a plan view of the first pixel 101. FIG. 3B is a plan view of the second pixel 121. FIG. 3C is a sectional view showing the second pixel 121 taken along a line A-A' in FIG. 3B. This embodiment uses an indirect type conversion element using a scintillator which converts radiation into light and a photoelectric conversion element which converts light obtained by the scintillator into electric charge. As shown in FIG. 3A, the conversion element 102 and the switch element 103 are arranged in the first pixel 101. In addition, as shown in FIG. 3B, the conversion element 102, the switch element 103, the detecting element 122, and the switch element 123 are arranged in the second pixel 121. As shown in FIG. 3C, the conversion element 102 may use a PIN photodiode 134. Like the conversion element 102, the detecting element 122 may also use a PIN photodiode 135. The conversion element 102 is stacked on a dielectric interlayer 130 on the switch element 103 using the TFT provided on the insulating support substrate 100 such as a glass substrate. Likewise, the detecting element 122 is stacked on the dielectric interlayer 130 on the switch element 123 using the TFT provided on the support substrate 100.

The conversion element 102 and the detecting element 122 are insulated so as not to electrically conduct to first and second electrodes 131 and 132 of the conversion element 102 and the detecting element 122 which are respectively adjacent to the conversion element 102 and the detecting element 122, and an inter-element insulating film 133 improves the insulation between the first electrodes 131 and 132. The PIN photodiodes 134 and 135 are stacked on the first electrodes 131 and 132 and the inter-element insulating film 133 in the order of n-layer, i-layer, and p-layer. Second electrodes 136 and 137 are respectively arranged on the photodiodes 134 and 135. A protective film 138, a second dielectric interlayer 139, the bias line 108, and a protective film 140 are arranged so as to cover the photodiodes 134 and 135. A planarization film (not shown) and a scintillator (not shown) are arranged on the protective film 140. The second electrodes 136 and 137 are both connected to the bias line 108. In this embodiment, for example, light-transmitting electrodes such as indium tin oxide (ITO) electrodes are used for the second electrodes 136 and 137. The second electrodes 136 and 137 are configured to transmit light converted from radiation by a scintillator (not shown) on the protective film 140 to the photodiodes 134 and 135.

As shown in FIGS. 3A and 3B, the first pixel 101 differs in the size of the conversion element 102 from the second pixel 121. For this reason, even if the amount of radiation incident on the first pixel 101 is the same as that on the second pixel 121, the respective conversion elements 102 output different amounts of electric charge. When using, for a radiation image, an electrical signal read out from electric charge output from the conversion element 102 of the second pixel 121 by using the readout circuit 222, it is preferable to perform necessary correction such as white balance correction (gain correction). Alternatively, for example, only the detecting element 122 may be arranged in the second pixel 121, with no conversion element 102 being arranged. In this case, although some pixels output no electrical signal for the formation of a radiation image, a radiation image may be corrected by using electrical signals output from the first pixels 101 arranged around the second pixel 121. In addition, in the detecting element 122, an electrical signal used for the detection of an incident radiation dose may be used for the formation of a radiation image.

An operation procedure of each constituent element of the radiation imaging apparatus will be described next with reference to FIG. 4A. FIG. 4A is a flowchart when performing image sensing in this embodiment. First of all, the user inputs image sensing information on the user interface of the radiation control unit 229. The image sensing information includes, for example, the tube voltage and tube current of the radiation source, an irradiation time, and a target radiation dose. In addition, if the pixel array 228 is provided with a plurality of detecting elements 122, the image sensing information may include the information of the position of the detecting element 122, of the plurality of detecting elements 122, which obtains an incident radiation dose, that is, a position at which an incident radiation dose is obtained. In addition, when forming one pixel of a radiation image by using outputs from a plurality of first pixels 101 or an output from the conversion element 102 of the second pixel 121, the image sensing information may include a binning count and a gain setting in the readout circuit 222. In addition, the user may select a combination of image sensing information set in advance from recipes saved in the radiation control unit 229 instead of inputting image sensing information piece by piece. Alternatively, the radiation control unit 229 may automatically determine a combination of image sensing information when, for example, the user inputs an image sensing region or the age, physical size, and the like of an object. The radiation control unit 229 supplies radiation irradiation information such as an irradiation time and a target radiation dose of the image sensing information to the control unit 225 of the radiation imaging apparatus 200.

In this embodiment, the control unit 225 determines a detection cycle of detecting the dose of radiation incident on the detecting element 122 during a radiation irradiation period during which a radiation image is obtained, based on irradiation time information of the radiation irradiation information input from the radiation control unit 229. The control unit 225 may determine a detection cycle so as to make a sampling count constant with respect to, for example, an irradiation time. In this case, a detection cycle may be determined by calculation using, for example, a calculation unit such as an FPGA mounted in the control unit 225. Alternatively, for example, the relationship between irradiation times and detection cycles may be stored as an LUT (LookUp Table) in the memory of the control unit 225 in advance, and a detection cycle may be determined from the information of the LUT in consideration of an irradiation time input from the radiation control unit 229.

For example, the control unit 225 divides an irradiation time input from the radiation control unit 229 so as to set the sampling count to 100, and uses each divided time as a detection cycle. In this case, if the irradiation time is 300 ms, the detection cycle is determined as 3 ms. If the irradiation time is 100 ms, the detection cycle is determined as 1 ms.

In addition, when forming one pixel of a radiation image by using outputs from the plurality of conversion elements 102 included in the plurality of first pixels 101 or the second pixels 121 included in the radiation imaging apparatus 200, the control unit 225 may determine a detection cycle based on a binning count. If, for example, the binning count is large with respect to one piece of irradiation time information, it is possible to increase the sampling count and shorten the detection cycle. If the binning count is small, it is possible to decrease the sampling count and prolong the detection cycle.

Upon determining a detection cycle, the control unit 225 determines the amount of noise output from the second pixel 121 which operates in the determined detection cycle, based on the determined detection cycle, before irradiation with radiation. For example, the control unit 225 may cause the second pixel 121 to perform the same operation as that at the time of irradiation with radiation before irradiation with radiation in the determined detection cycle, and use the signal value of an electrical signal output from the second pixel 121 as an amount of noise. It is possible to use, as an amount of noise, a signal value obtained by causing the second pixel 121 to operate once in the determined detection cycle or signal values obtained by causing the second pixel 121 to operate a plurality of times. If a plurality of signal values is obtained by causing the second pixel 121 to operate a plurality of times, for example, the average value of the respective signal values may be used as an amount of noise. Obtaining a plurality of signal values and averaging them can suppress the influence of random components of noise output from the second pixel 121. The amount of noise is used to correct the radiation dose obtained by the second pixel 121 during irradiation with radiation.

When the user turns on an exposure switch provided for the radiation control unit 229 after the determination of a detection cycle and an amount of noise, the radiation control unit 229 outputs an exposure instruction to the radiation source 227 and the control unit 225 of the radiation imaging apparatus 200. The radiation source 227 starts irradiation with radiation in accordance with the exposure instruction. In addition, the control unit 225 causes the detecting unit 223 to operate in accordance with the exposure instruction and starts obtaining a radiation image. More specifically, the control unit 225 accumulates electric charge corresponding to the dose of radiation incident on each of the conversion elements 102 of the first pixels 101 arranged in the pixel array 228 of the detecting unit 223. At the same time, the control unit 225 causes the detecting element 122 of the second pixel 121 to start a detecting operation of obtaining an incident radiation dose in the detection cycle determined in advance. In this case, the exposure switch may be a two-stage switch including a switch for starting idling the radiation tube of the radiation source 227 and a switch for irradiating an object with radiation. In this case, when the switch for starting idling the radiation tube is turned on, the control unit 225 may cause a detecting element to operate in the detection cycle determined in advance from radiation irradiation information and determine an amount of noise. Upon determining the amount of noise based on the detection cycle, the control unit 225 starts obtaining a radiation image by irradiating the object with radiation.

The control unit 225 then corrects the radiation dose obtained by the detecting element 122 of the second pixel 121 for each detection cycle in accordance with the noise amount determined before irradiation with radiation, and obtains the cumulative total value of radiation doses after correction. The control unit 225 then compares the cumulative total value of radiation doses with the target radiation dose information of irradiation information supplied from the radiation control unit 229. The control unit 225 performs exposure stop determination of determining whether to continue or stop irradiation with radiation, based on the result obtained by comparing the cumulative total value of the radiation doses after correction with the target radiation dose. If the cumulative total value of the radiation doses detected by the detecting element 122 of the second pixel 121 has not reached the target radiation dose, the control unit 225 determines that it is necessary to continue irradiation with radiation, and continues to obtain a radiation image and perform a detecting operation. If the cumulative total value of the radiation doses detected by the detecting element 122 of the second pixel 121 has reached the target radiation dose of radiation to be applied or is expected to reach the target radiation dose, a stop determination signal for stopping irradiation with radiation is output to the radiation control unit 229. The radiation control unit 229 outputs an exposure stop instruction to the radiation source 227 based on the stop determination signal output from the control unit 225. The radiation source 227 stops irradiation with radiation in accordance with the exposure stop instruction. When stopping irradiation with radiation, the control unit 225 may stop irradiation with radiation by inhibiting the radiation control unit 229 from outputting an exposure instruction to the radiation source 227 instead of outputting an exposure stop instruction. In addition, the detecting unit 223 may stop a detecting operation in accordance with the exposure stop instruction.

Figure 4B:
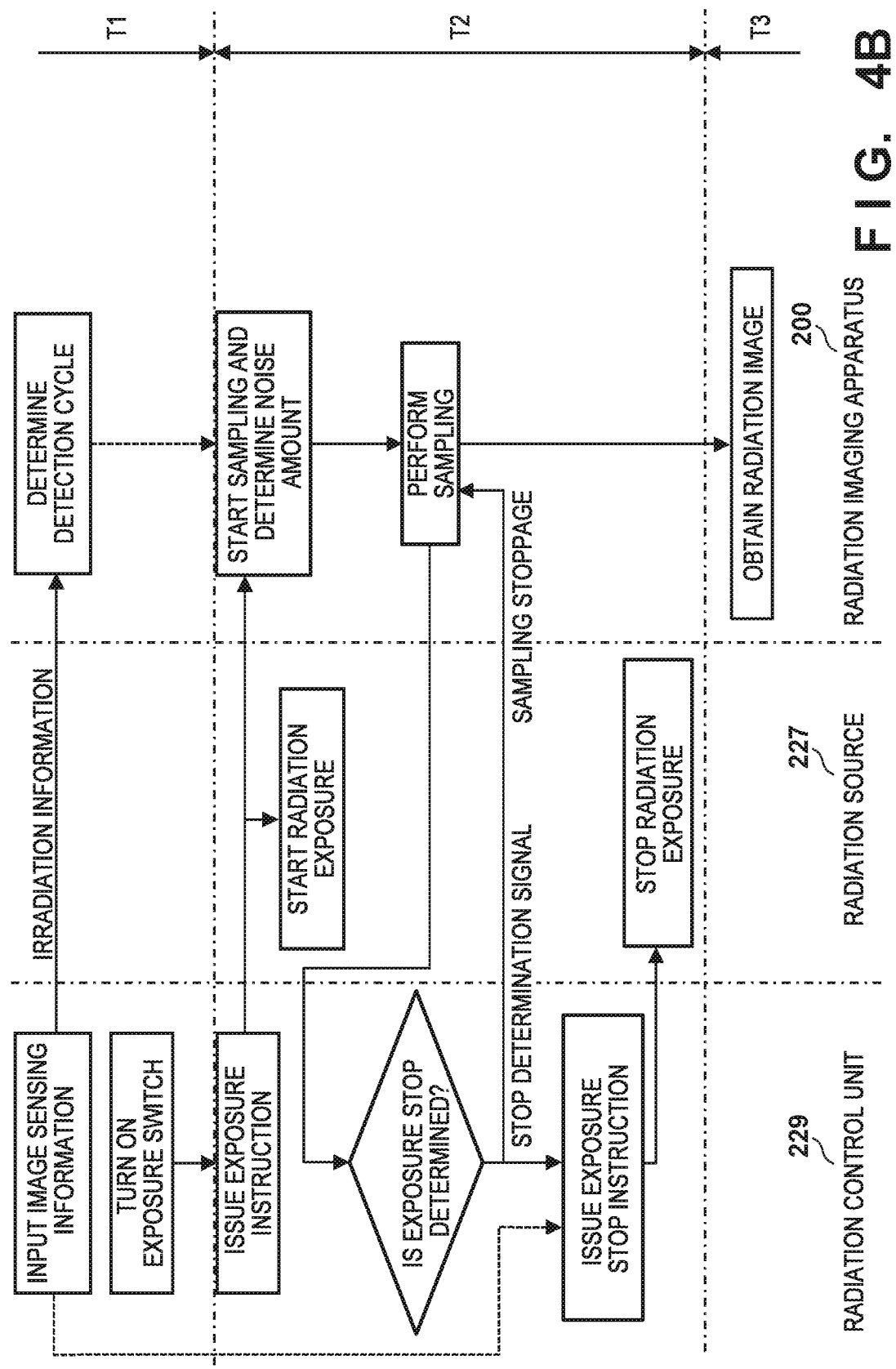

In this embodiment, the control unit 225 of the radiation imaging apparatus 200 performs exposure stop determination. However, this is not exhaustive. For example, as shown in FIG. 4B, the control unit 225 outputs, to the radiation control unit 229, the cumulative total value of radiation doses obtained by correcting the radiation dose detected by the detecting element 122 of the second pixel 121 in accordance with an amount of noise. The radiation control unit 229 may perform stop determination based on this corrected cumulative total value of radiation doses and output an exposure stop instruction. In this case, before irradiation with radiation, the radiation control unit 229 supplies irradiation time information of image sensing information as irradiation information to the control unit 225 but need not send target radiation dose information to the control unit 225. In addition, the control unit 225 may stop obtaining a radiation image and detecting a radiation dose in accordance with an exposure stop instruction output from the radiation control unit 229 upon its exposure stop determination.

In addition, the control unit 225 may output an exposure stop signal when the irradiation time of irradiation of an object with radiation from the radiation source 227 reaches the upper limit of irradiation times of irradiation time information supplied from the radiation control unit 229 before the irradiation with radiation. In accordance with the exposure stop signal, the radiation control unit 229 outputs an exposure stop instruction to the radiation source 227, and the radiation source 227 stops irradiation with radiation. Even before the cumulative total value of the doses of radiation incident on the detecting element 122 reaches a target radiation dose or is expected to reach the target radiation dose, irradiation with radiation is stopped in accordance with the upper limit of irradiation times. Even if the dose of radiation incident on the detecting element 122 of the second pixel 121 is not normally detected, excessive irradiation of an object with radiation can be avoided.

Figure 5B:
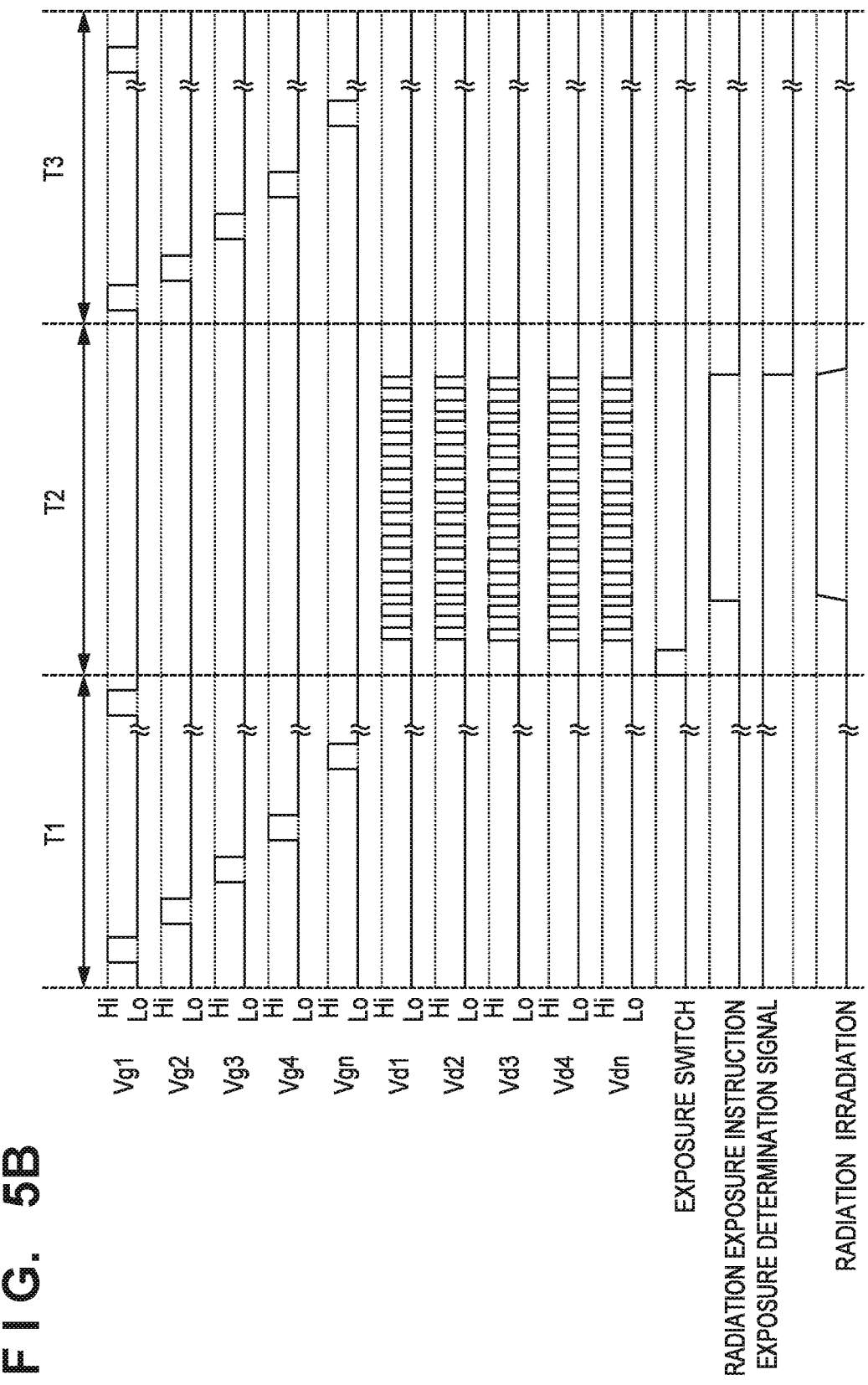

The operation timing of each constituent element of the radiation imaging apparatus according to this embodiment will be described next with reference to FIGS. 2, 4A, 4B, 5A, and 5B. FIGS. 5A and 5B are timing charts each showing the operation timing of each constituent element of the radiation imaging apparatus 200. A period T1 shown in FIGS. 4A, 4B, 5A, and 5B indicates an idling period during standby. In the period T1, as shown in FIGS. 5A and 5B, the pixel array 228 repeats an idling operation in accordance with a signal applied from the driving circuit 221. The idling operation may be performed, for example, until the start of image sensing after the power supply of the detecting unit 223 is turned on. Referring to FIGS. 4A and 4B, the period T1 is a time during which the user inputs image sensing information, a time before the user presses the exposure switch, or a time during which the control unit 225 of the radiation imaging apparatus 200 determines a detection cycle.

In the period T1, in order to periodically remove dark currents generated from the conversion elements 102, Hi signals are periodically applied to the gate control voltages Vg1 to Vgn to scan the switch elements 103 of the first pixels 101. Likewise, in order to remove dark currents generated from the detecting elements 122 of the second pixels 121, Hi signals are always applied to the gate control voltages Vd1 to Vdn to set the switch elements 123 of the second pixels 121 in a conducting state. In this case, a Hi signal is a voltage at which each of the switch elements 103 and 123 is turned on. A Lo signal is a voltage (for example, 0 V) at which each of the switch elements 103 and 123 is turned off. The timing charts according to this embodiment shown in FIGS. 5A and 5B each show an example of detecting an incident radiation dose by using a plurality of detecting elements 122. In this case, the same target radiation dose or different target radiation doses may be set in the respective detecting elements 122. In addition, the control unit 225 may output a stop determination signal when one of the detecting elements 122 of the plurality of second pixels 121 reaches the target radiation dose or when all the detecting elements 122 reach the target radiation dose or doses. These settings may be made as needed in accordance with an object, image sensing conditions, the positions of the detecting elements 122 in the pixel array 228, and the like.

When the user presses the exposure switch or the switch for starting idling of the radiation tube of the radiation source 227, a transition occurs to a period T2. The period T2 is a time during which the amount of noise from each second pixel 121 is determined, and a radiation image is then obtained by irradiation with radiation. FIGS. 5A and 5B show timing charts each showing a case in which image sensing is started when the user turns on the exposure switch. In the period T2, Lo signals are applied to the gate control voltages Vg1 to Vgn for driving the switch elements 103, and each conversion element 102 accumulates electric charge corresponding to an incident radiation dose. In addition, Hi signals are applied to the gate control voltages Vd1 to Vdn for driving the switch elements 123 in a detection cycle determined in the period T1, and electric charge detected by each detecting element 122 is sent to the readout circuit 222 via the detection line 110. The readout circuit 222 supplies an electrical signal based on the detected electric charge to the control unit 225 via the signal processing unit 224. The control unit 225 obtains the dose of radiation incident on each detecting element 122 in the detection cycle.

First of all, the control unit 225 obtains an amount of noise from each second pixel 121 in accordance with an electrical signal read out to the readout circuit 222 before the user presses the exposure switch to perform irradiation with radiation. FIGS. 5A and 5B are timing charts in cases in which irradiation times of irradiation information transferred from the radiation control unit 229 to the control unit 225 in advance differ from each other. FIG. 5B shows a case in which an irradiation time shorter than that in the case shown in FIG. 5A is input, and hence the gate control voltages Vd1 to Vdn become Hi signals in shorter cycles. Referring to the timing chart shown in FIG. 5A, a signal value output once from the second pixel 121 is used as an amount of noise. Referring to the timing chart shown in FIG. 5B, since the detection cycle is short, an average value of two signal values output from the second pixel 121 before irradiation with radiation is used as an amount of noise. Averaging a plurality of obtained signal values can obtain noise while suppressing the influence of random noise even when a signal amount is small because of a short detection cycle. This makes it possible to more accurately perform correction when obtaining the cumulative total value of the doses of radiation incident during irradiation with radiation. After the noise amount of each detecting element 122 is determined, irradiation of radiation is performed. Each conversion element 102 then accumulates electric charge corresponding to an incident radiation dose, thereby obtaining a radiation image.

Figure 6:
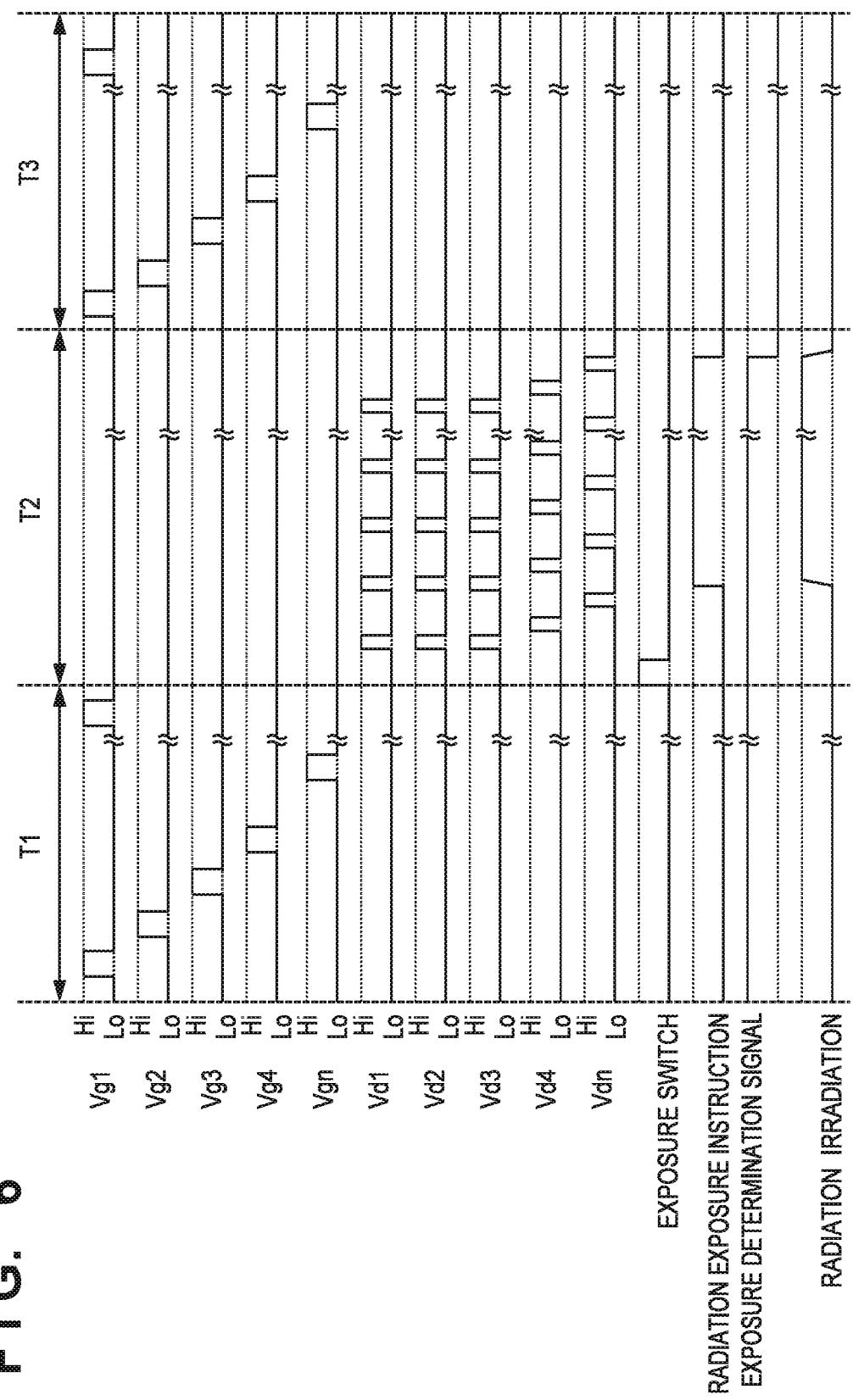
FIG. 6 is a timing chart showing a modification of each of the timing charts of FIGS. 5A and 5B.

Referring to FIGS. 5A and 5B, the gate control voltages Vd1 to Vdn applied to the control electrodes of the switch elements 123 simultaneously become Hi signals. However, the operation in the period T2 is not limited to this. For example, as shown in FIG. 6, the gate control voltages Vd1 to Vdn corresponding to the switch elements 123 of the detecting elements 122 connected to the same detection line 110 may become Hi signals at different timings. In this case, although the amount of signals that can be read out once decreases, the spatial resolution of a detection region can be increased.

The operational amplifiers 150 convert electric charge sent from the detecting elements 122 to the readout circuit 222 into voltage information. The sample/hold circuits 151 then sample the voltage information based on a detection cycle. The A/D converter 153 converts the sampled information into an electrical signal via the multiplexers 152.

The control unit 225 corrects a radiation dose obtained by converting electric charge detected by each detecting element 122 into an electrical signal in accordance with an amount of noise. Thereafter, the control unit 225 performs exposure stop determination based on the cumulative total value of corrected radiation doses and target radiation dose information transferred from the radiation control unit 229 to the control unit 225. When the cumulative total value of radiation doses reaches the target radiation dose or is expected to reach the target radiation dose, the control unit 225 outputs a stop determination signal for stopping irradiation with radiation to the radiation control unit 229. The radiation control unit 229 then causes the radiation source 227 to stop irradiation with radiation. The duration of the period T2 may be determined for each image sensing mode or an irradiation time input in advance. Even if the radiation dose does not reach the target radiation dose as in the above case, when the irradiation time reaches the upper limit of irradiation times input as irradiation information, the control unit 225 stops irradiation with radiation. After the cumulative total value of radiation doses detected by the detecting elements 122 reaches the target radiation dose or a predetermined time elapses, a transition occurs from the period T2 to a period T3.

The period T3 is a period during which after irradiation with radiation, radiation images are obtained by image sensing. In the period T3, the control unit 225 outputs control signals to the driving circuit 221 to read out signal charge accumulated in the conversion elements 102. The driving circuit 221 sequentially applies Hi signals to the gate control voltages Vg1 to Vgn in accordance with the control signals to sequentially scan the switch elements 103 of the first and second pixels 101 and 121. The operational amplifiers 150 convert electric charge accumulated in the conversion elements 102 into voltage information. The sample/hold circuits 151 then sample the voltage information. The A/D converter 153 converts the sampled information into an electrical signal as digital data via the multiplexers 152. A radiation image is formed based on electrical signals obtained by the conversion elements 102 and read out.

The effects of this embodiment will be described below. In the period T2 shown in each of FIGS. 5A and 5B, a detection signal is sampled from each second pixel 121 in a proper detection cycle based on an irradiation time input in advance. Therefore, when the radiation irradiation time is long and low-energy radiation is incident at a low dose per unit time, setting a long detection cycle will prolong the accumulation time of signals and suppress the possibility that detection signals will be buried in noise. When the radiation irradiation time is short and high-energy radiation is incident at a high dose per unit time, setting a short detection cycle makes it possible to obtain detection signals without saturating the capacity of each detecting element 122 in terms of accumulating electric charge.

In addition, the amount of noise output from each second pixel 121 can change depending on operation conditions for the detecting element 122 and the switch element 123. For example, a dark current in the detecting element 122 or the offset level of the switch element 123 may change depending on a detection cycle or a temperature at the time of image sensing. The influences of such changes can change the amount of noise output from each second pixel 121. In this embodiment, therefore, before irradiation with radiation, the amount of noise output from each second pixel is obtained in the same detection cycle as when detecting radiation. This makes it possible to obtain an amount of noise in accordance with a detection cycle or image sensing environment for each second pixel 121.

Each second pixel 121 is operated in a proper detection cycle based on radiation irradiation information of image sensing information input in advance by the user. In addition, the noise amount of the second pixel 121 is obtained in the same detection cycle. Thereafter, irradiation with radiation is performed, and a radiation dose obtained by the second pixel 121 during irradiation with radiation is corrected in accordance with the amount of noise to obtain the dose of radiation actually incident on the radiation imaging apparatus 200. This can set an exposure amount at the time of image sensing to a more proper exposure amount at the time of image sensing and hence can improve the quality of a sensed image.

Figure 7A:
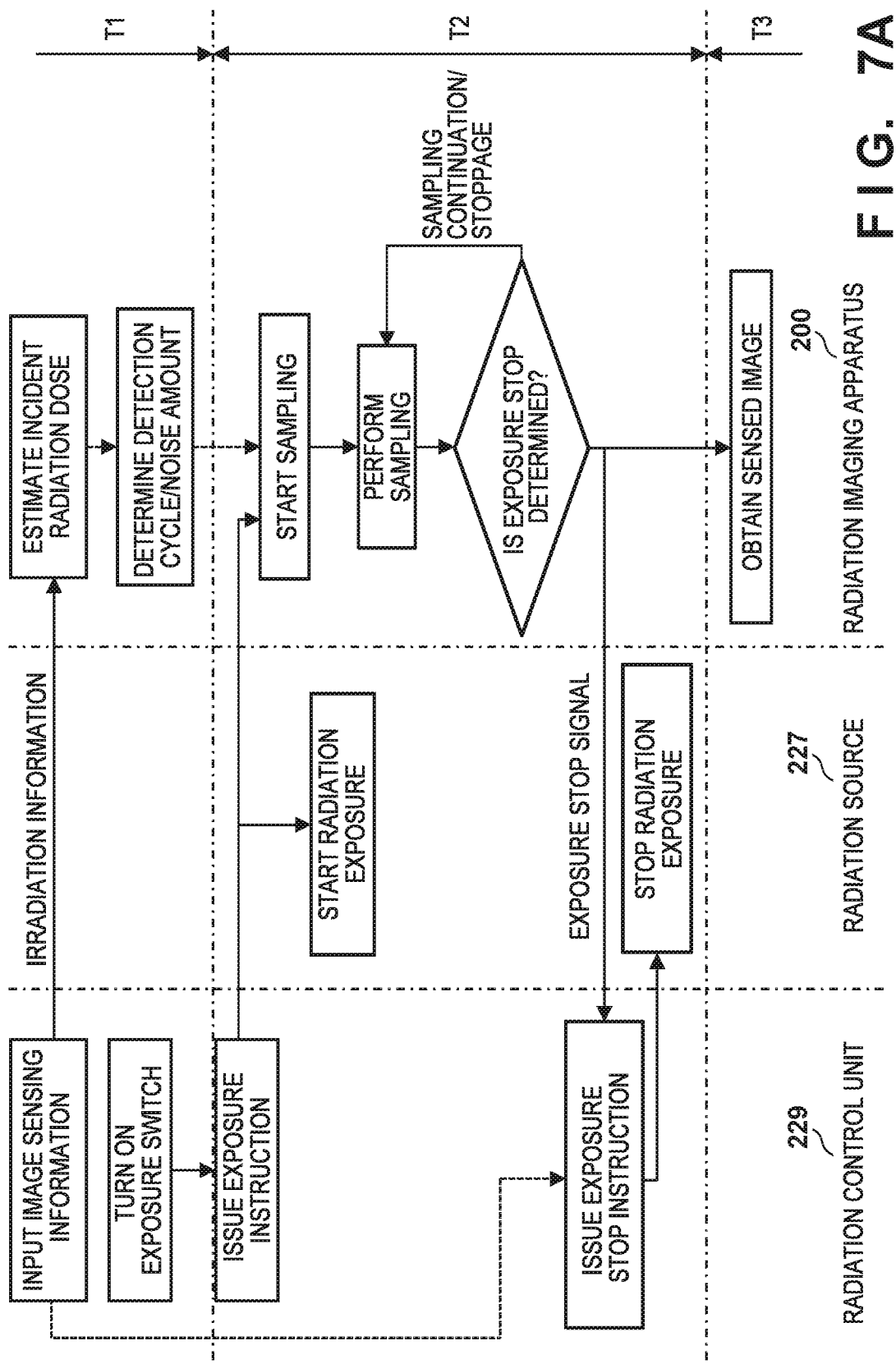
FIGS. 7A and 7B are flowcharts showing modifications of the flowcharts of FIGS. 4A and 4B.

A radiation imaging apparatus according to a second embodiment of the present invention will be described with reference to FIG. 7A. FIG. 7A is a flowchart for explaining the operation of each constituent element of the radiation imaging apparatus according to this embodiment at the time of image sensing. A radiation imaging apparatus 200, a radiation control unit 229, and a radiation source 227 may have the same arrangements as those shown in FIGS. 1A and 1B in the first embodiment described above. In the first embodiment, a detection cycle for the detection of a radiation dose is determined by using, as radiation irradiation information, irradiation time information of image sensing information. In contrast to this, the second embodiment uses, as irradiation information, at least one of the following pieces of information: the tube voltage and tube current of a radiation source, the distance between the radiation source and an object, a grid exposure factor, an object thickness, the radiation transmittance of an object region of interest, and the radiation absorptance of an added filter such as an Al filter. A proper detection cycle is determined by estimating an estimated radiation dose of radiation incident per unit time concerning the irradiation dose of radiation or a physical amount correlated with the dose of incident radiation by using these pieces of information.

It is possible to input the following pieces of image sensing information from the radiation control unit 229 as a user interface: the tube voltage and tube current of the radiation source, the distance between the radiation source and an object, a grid exposure factor, an object thickness, the radiation transmittance of an object region of interest, and the radiation absorptance of an added filter. Alternatively, sensors may be provided for the radiation imaging apparatus 200, the radiation control unit 229, and the radiation source 227 to automatically obtain some of these pieces of image sensing information. For example, the distance between the radiation source 227 and an object may be measured by an infrared sensor attached to the radiation source 227. In addition, a camera connected to the radiation control unit 229 may be used to estimate an object thickness or specify a region of an object as a region of interest and estimate the radiation transmittance of the object region of interest. Furthermore, calibration may be performed in advance to obtain the distance between the radiation source and an object, a grid exposure factor, the radiation absorptance of the added filter, and the like. Alternatively, the radiation imaging apparatus 200 may have a user interface, and the user may input image sensing information to the interface.

In this embodiment, the radiation control unit 229 sends, to the radiation imaging apparatus 200, irradiation information, of image sensing information, which is associated with the irradiation dose of radiation with which the radiation imaging apparatus 200 is irradiated. A control unit 225 of the radiation imaging apparatus 200 calculates an estimated radiation dose of radiation incident per unit time by using equation (1) given below with respect to this irradiation information:

$$E(t) = \frac{V^n \cdot I}{SID^2} \cdot \frac{1}{B} \cdot Al(V) \cdot \exp^{-\mu d} \quad (1)$$

where V is a tube voltage, n is a tube voltage index, I is a tube current, SID is an object distance, B is a grid exposure factor, d is an object thickness, μ is the radiation transmittance of an object region of interest, Al(V) is the radiation absorptance of the added filter, and E(t) is an estimated radiation dose of radiation incident per unit time. Since the estimated value E(t) of the dose of radiation incident per unit time is proportional to the amount of detection signals per unit time, a detection cycle is determined in proportion to this value.

If not all the pieces of irradiation information indicated by equation (1) can be obtained, for example, standard values may be input concerning parameters whose information has not been obtained. Inputting at least one of the pieces of irradiation information makes it possible to bring a detection cycle close to an optimal value and more accurately obtain the dose of incident radiation.

The amount of noise output from each detecting element 122 may be obtained by operating a second pixel 121 in a period T2 before irradiation with radiation as in the first embodiment described above. Alternatively, each second pixel 121 is operated in a plurality of detection cycles without irradiation with radiation in advance, and each signal value output from the second pixel 121 is stored in a noise amount memory unit 231 provided for the control unit 225 as shown in FIG. 1A. For example, the control unit 225 may determine an amount of noise by performing calculation in accordance with a determined detection cycle by using these signal values. For example, the second pixel 121 obtains in advance an amount of noise a obtained in advance in a detection cycle A and an amount of noise b obtained in a detection cycle B. In this case, if a detection cycle is determined as a detection cycle C, an amount of noise c used for correction may be calculated by using equation (2) given below:

$$c = \frac{a-b}{\frac{1}{A}-\frac{1}{B}} \times \frac{1}{C} + \frac{Bb-Aa}{B-A} \quad (2)$$

The respective signal values may be obtained in a plurality of detection cycles, for example, at the time of turning on the power of the radiation imaging apparatus 200 or during a period T1. Alternatively, for example, signal values may be obtained in a plurality of detection cycles at factory shipment, and may be saved in the noise amount memory unit 231.

In addition, for example, the relationship between detection cycles and noise amounts may be stored in the form of an LUT in the noise amount memory unit 231 in advance, and the control unit 225 may determine an amount of noise from the information of the LUT with respect to a determined detection cycle. When determining an amount of noise by the above calculation or using the information of the LUT, it is possible to determine an amount of noise in the period T1, as shown in FIG. 7A.

In this embodiment, in order to determine a detection cycle, the dose of radiation incident on the radiation imaging apparatus 200 per unit time is estimated by using information concerning the dose of incident radiation such as the tube voltage or tube current of the radiation source. If, therefore, the dose of radiation incident per unit time is small, a long detection cycle is set. This prolongs the accumulation time of signals, and hence suppresses the possibility that detection signals are buried in noise. In contrast to this, if the dose of radiation incident per unit time is large, a short detection cycle is set. This makes it possible to obtain a detection signal of a proper signal amount with respect to the capacity of the detecting element 122, which allows the accumulation of electric charge. The amount of noise output from the detecting element 122 is determined in accordance with the determined detection cycle. This makes it possible to obtain the dose of radiation incident on the radiation imaging apparatus 200 with higher accuracy as in the first embodiment. This can improve the image quality of a sensed image.

Figure 7B:
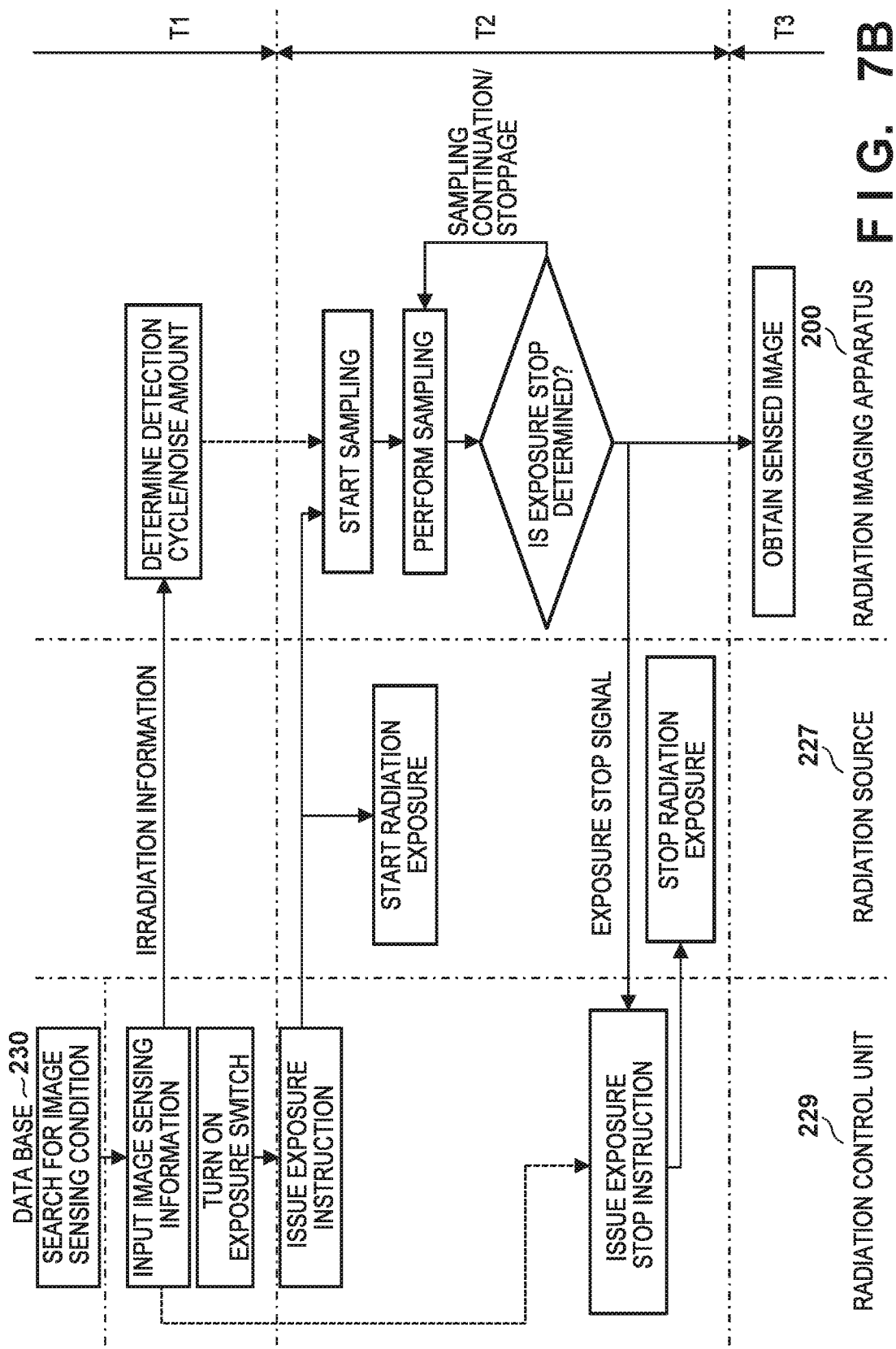

A radiation imaging apparatus according to a third embodiment of the present invention will be described with reference to FIGS. 1B and 7B. FIG. 1B shows an example of the arrangement of a radiation imaging apparatus 200a according to this embodiment. Unlike the first embodiment shown in FIG. 1A, a radiation control unit 229 which controls a radiation source 227 connected to the radiation imaging apparatus 200a is connected to a database 230. This apparatus may be the same as the radiation imaging apparatus 200 shown in FIG. 1A in other respects.

The database 230 saves image sensing information concerning past image sensing conditions including irradiation time information. In the first embodiment, a detection cycle for the detection of a radiation dose is determined by using irradiation time information of image sensing information. In contrast to this, in the second embodiment, as indicated by the flowchart of FIG. 7B, when determining a detection cycle, the radiation control unit 229 compares image sensing information input by the user to the user interface of the radiation control unit 229 with information saved in the database 230. For example, the user inputs image sensing information concerning the tube voltage and tube current of radiation, an image sensing region, an object thickness, and the like to the radiation control unit 229. The radiation control unit 229 searches the database 230 for past image sensing conditions having image sensing information similar to the input image sensing information, and checks the actual value of the time duration of irradiation with radiation at the image sensing time obtained by the search. The radiation control unit 229 then transfers the actual value of the irradiation time to a control unit 225. The control unit 225 determines a detection cycle based on this actual value. In addition, the detection cycle may be stored in the database 230. Based on the determined detection cycle, the control unit 225 determines the amount of noise output from each second pixel 121. It is possible to determine an amount of noise by using either of the methods according to the first and second embodiments.

In this embodiment, the radiation control unit 229 searches the database 230 for information concerning image sensing information input by the user. However, this is not exhaustive. For example, the radiation control unit 229 may transfer radiation irradiation information of image sensing conditions input by the user to the control unit 225, and the control unit 225 may search the database 230 for image sensing conditions.

A method of determining a detection cycle by using the database 230 is not limited to the above method. For example, when performing imaging sensing of the same region of the same patient for a follow-up check or the like, the user inputs a patient name, a patient identification (ID), and the like to the radiation control unit 229 to make the radiation control unit 229 obtain image sensing information such as radiation irradiation conditions and an irradiation time at the time of image sensing in the past from the database 230. Based on this image sensing information, the radiation control unit 229 transfers, to the control unit 225 of the radiation imaging apparatus 200, irradiation information concerning the irradiation time and irradiation dose of radiation with which the radiation imaging apparatus 200 is irradiated. The control unit 225 may determine a detection cycle based on this irradiation information.

Image sensing information concerning past image sensing conditions to be saved in the database 230 may be accumulated for each image sensing operation for an object which has actually undergone image sensing. Alternatively, for example, the database 230 may save image sensing information artificially generated at factory shipment or at the time of maintenance.

This embodiment uses past image sensing information such as the irradiation time of radiation or the like to determine a detection cycle. This makes it possible to more accurately obtain the dose of incident radiation. When performing similar image sensing operations with respect to an object, a detection cycle is constant. This makes it possible to manage AEC (Automatic Exposure Control) under the same conditions when using similar image sensing conditions. In addition, the amount of noise output from each detecting element 122 is determined in accordance with a determined detection cycle. As in the first and second embodiments, this makes it possible to more accurately obtain the dose of radiation incident on the radiation imaging apparatus 200 and hence to improve the quality of a sensed image.

The third embodiment according to the present invention has been described above. The above embodiments can be changed and combined with each other, as needed.

In addition, if the control unit 225 cannot determine at least either of a detection cycle and an amount of noise, the radiation imaging apparatus 200 need not perform irradiation with radiation. If, for example, an input image sensing condition greatly differs from an approximate recommended value determined by an image sensing region, sex, age, and the like of an object, the control unit 225 need not be able to determine a detection cycle or noise amount by using a mechanism such as an interlock. If a detection cycle or noise amount cannot be determined, for example, the control unit 225 need not permit the radiation control unit 229 or the radiation source 227 to start irradiation with radiation. In addition, for example, if no actual values of irradiation times are saved in the database 230 or a radiation irradiation time is too short to determine a detection cycle, the control unit 225 may not permit the start of irradiation with radiation.

Figure 8:
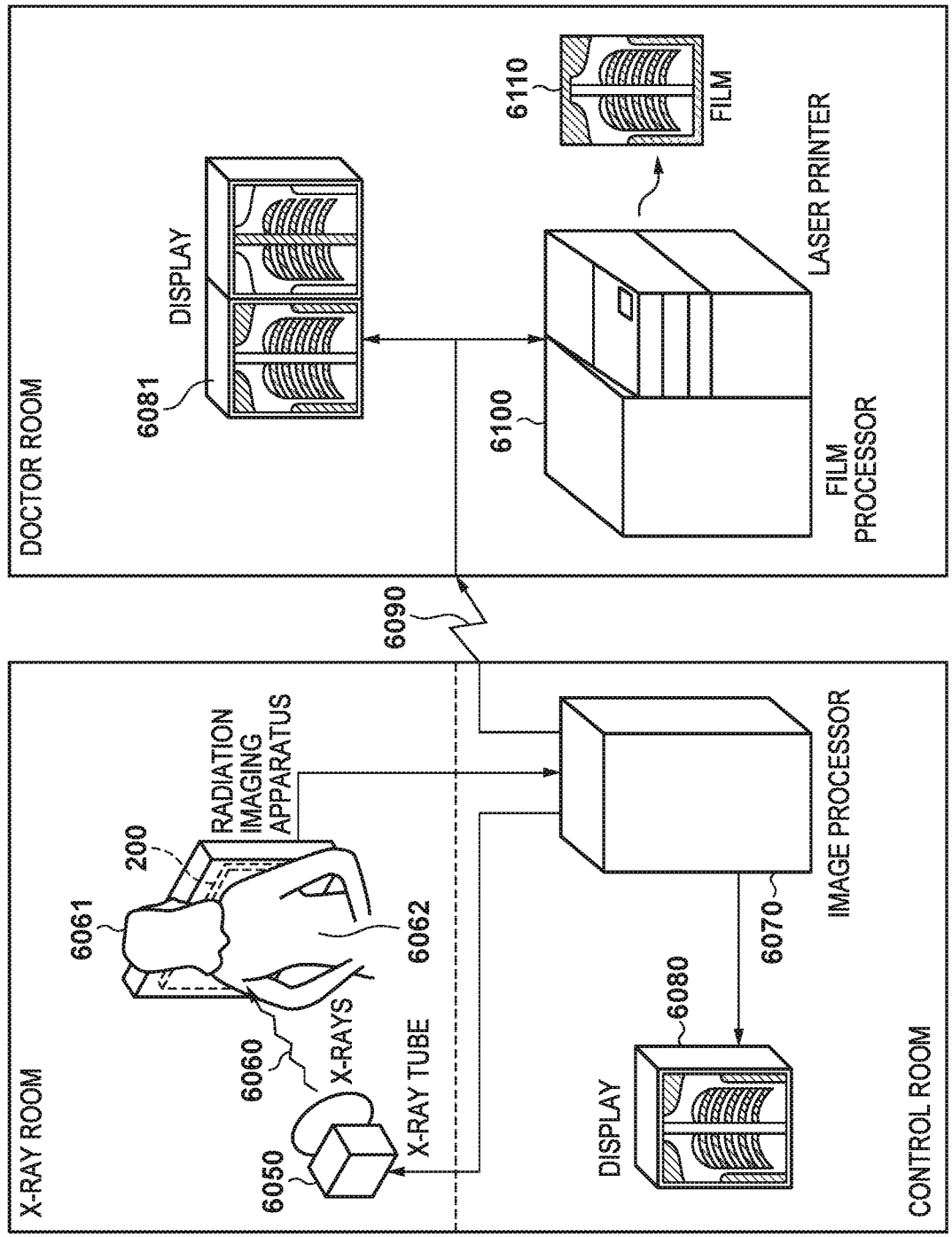
FIG. 8 is a view for explaining an example of the arrangement of a radiation imaging system using the radiation imaging apparatus according to the present invention.

A radiation imaging system incorporating the radiation imaging apparatus 200 according to the present invention will be exemplarily described below with reference to FIG. 8. X-rays 6060 generated by an X-ray tube 6050 as a radiation source are transmitted through a chest region 6062 of a patient or object 6061 and enter the radiation imaging apparatus 200 according to the present invention. The incident X-rays include information about the inside of the body of the patient or object 6061. In the radiation imaging apparatus 200, the scintillator emits light as the X-rays 6060 enter, and electrical information is obtained by photoelectric conversion of the emitted light using photoelectric conversion elements. This information is converted into a digital signal. An image processor 6070 serving as a signal processing unit performs image processing of the signal. It is possible to observe the resultant image on a display 6080 serving as a display unit in a control room. In addition, it is possible to transfer this information to a remote place via a transmission processing unit such as a telephone line 6090. The information can be displayed on a display 6081 as a display unit in another place such as a doctor room or can be stored in a recording unit such as an optical disk. This makes it possible for a doctor in a remote place to perform diagnosis. In addition, this information can be recorded on a recording medium such as an optical disk. Furthermore, a film processor 6100 can record the information on a film 6110 as a recording medium.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-190335, filed Sep. 28, 2015, which is hereby incorporated by reference wherein in its entirety.

What is claimed is:

1. A radiation imaging apparatus comprising:
a plurality of first pixels arranged in an image sensing region to obtain a radiation image;
a second pixel configured to obtain a dose of incident radiation during irradiation with radiation; and
a control unit configured to control the plurality of first pixels and the second pixel,
wherein the control unit causes the plurality of first pixels to accumulate electric charge corresponding to a radiation dose,
while causing the second pixel to operate in a detection cycle determined based on irradiation information of radiation before irradiation with radiation, obtains a dose of incident radiation for each detection cycle, and
corrects the obtained radiation dose in accordance with an amount of noise output from the second pixel operating in the detection cycle.

2. The apparatus according to claim 1, wherein the control unit is further configured to
stop irradiation with radiation based on a radiation dose after correction, and
read out electric charge accumulated in the plurality of first pixels after irradiation with radiation.

3. The apparatus according to claim 1, wherein the irradiation information includes information of irradiation time of radiation, and
the control unit determines the detection cycle based on the irradiation time.

4. The apparatus according to claim 3, wherein the control unit calculates the detection cycle by dividing the irradiation time by a predetermined count.

5. The apparatus according to claim 3, wherein the control unit determines the detection cycle based on a lookup table indicating a relationship between irradiation times and detection cycles.

6. The apparatus according to claim 1, wherein the second pixel includes a detecting element configured to obtain a dose of incident radiation during irradiation with radiation,
the irradiation information includes information concerning a dose of radiation with which the radiation imaging apparatus is irradiated, and
the control unit determines an estimated radiation dose of radiation incident on the detecting element in a predetermined period in accordance with the information concerning radiation dose, and determines the detection cycle based on the estimated radiation dose.

7. The apparatus according to claim 1, further comprising a memory unit storing an image sensing condition,
wherein the control unit compares the irradiation information with the image sensing condition and determines the detection cycle based on the image sensing condition including the irradiation information.

8. The apparatus according to claim 1, wherein the irradiation information includes information of the number of first pixels, of the plurality of first pixels, which are used to form one pixel of the radiation image, and
the control unit determines the detection cycle based on the number of first pixels which are used to form one pixel.

9. The apparatus according to claim 1, wherein the control unit causes, before irradiation with radiation, the second pixel to operate in the detection cycle determined based on the irradiation information and uses a signal value output from the second pixel as the amount of noise.

10. The apparatus according to claim 9, wherein the control unit obtains the plurality of signal values output from the second pixel in the detection cycle and uses an average value of the plurality of obtained signal values as the amount of noise.

11. The apparatus according to claim 1, further comprising a noise amount memory unit storing each signal value output from the second pixel when the second pixel is made to operate in a plurality of detection cycles without irradiation with radiation,
wherein the control unit determines the amount of noise by using the respective signal value in accordance with the detection cycle determined based on the irradiation information.

12. The apparatus according to claim 1, wherein when the control unit fails to determine at least one of the detection cycle or the amount of noise, the apparatus does not perform irradiation with radiation.

13. The apparatus according to claim 1, wherein the irradiation information includes a target radiation dose of radiation incident on the second pixel, and
the control unit outputs a stop determination signal for stopping irradiation with radiation to a radiation source configured to irradiate the radiation imaging apparatus with radiation when the radiation dose after the correction has reached the target radiation dose or is expected to reach the target radiation dose.

14. The apparatus according to claim 13, wherein the irradiation information includes an upper limit of radiation irradiation time, and
the control unit outputs a stop determination signal for stopping irradiation with radiation to the radiation source when the radiation irradiation time has reached the upper limit before the radiation dose after the correction reaches the target radiation dose or is expected to reach the target radiation dose.

15. The apparatus according to claim 1, wherein the detection cycle is a constant cycle during irradiation with radiation.

16. The apparatus according to claim 1, wherein the plurality of first pixels include a plurality of conversion elements arranged in an image sensing region to obtain a radiation image, and
the second pixel is arranged in the image sensing region.

17. A radiation imaging system comprising:
a radiation imaging apparatus defined in claim 1; and
a signal processing unit configured to process a signal from the radiation imaging apparatus.

18. A method of controlling a radiation imaging apparatus including a plurality of first pixels arranged in an image sensing region to obtain a radiation image, and a second pixel configured to obtain a dose of incident radiation during irradiation with radiation, the method comprising:
causing the plurality of first pixels to accumulate electric charge corresponding to a radiation dose while causing the second pixel to operate in a detection cycle determined based on irradiation information of radiation before irradiation with radiation, obtaining a dose of incident radiation for each detection cycle; and correcting the obtained radiation dose in accordance with an amount of noise output from the second pixel operating in the detection cycle.

19. A program stored in a non-transitory storage medium for causing a computer to execute a method of controlling a radiation imaging apparatus including a plurality of first pixels arranged in an image sensing region to obtain a radiation image, and a second pixel configured to obtain a dose of incident radiation during irradiation with radiation, the method comprising:
 causing the plurality of first pixels to accumulate electric charge corresponding to a radiation dose while causing the second pixel to operate in a detection cycle determined based on irradiation information of radiation before irradiation with radiation, obtaining a dose of incident radiation for each detection cycle; and
 correcting the obtained radiation dose in accordance with an amount of noise output from the second pixel operating in the detection cycle.

* * * * *